July 26, 1960   L. C. EYMANN   2,946,666
APPARATUS FOR AMMONIATION OF PHOSPHATE MATERIALS
Filed Oct. 29, 1957   2 Sheets-Sheet 2

United States Patent Office 2,946,666
Patented July 26, 1960

2,946,666
APPARATUS FOR AMMONIATION OF PHOSPHATE MATERIALS

Lewis C. Eymann, 648 N. Clark St., Forest City, Iowa

Filed Oct. 29, 1957, Ser. No. 693,204

2 Claims. (Cl. 23—259.1)

This invention relates to the production of fertilizer and in particular, relates to the production in simple, inexpensive, batch type equipment of ammoniated phosphate material equal to or superior to similar materials heretofore produced in extremely expensive continuous equipment.

The batch processes heretofore employed have been carried out in conventional mixing drums. Pulverized phosphate materials have been placed in the drum and ammoniating material was distributed in various ways into the phosphate material. While various specific distributing procedures have been tried and ammoniating material in both liquid and gaseous form have been tried, it has not been found possible to establish a nitrogen content comparable with that achieved in continuous equipment. While it has been known that the addition of acid simultaneously with the addition of the addition of the ammoniating material should result in a higher ammoniating rate than previously known, batch systems have been unable to take advantage of this fact because in the conventional batch mixer the added acid has been found to react with KCl to form HCl as a gas or vapor, which in turn will react with the ammonia, forming ammonium chloride as a fine dust having no value. This results in a high loss of nitrogen as well as producing hazards from the standpoint of the danger of flash fires and explosions.

While there is a market for a pulverized ammoniated phosphate fertilizer, it is highly desirable that the product be in relatively coarse granular form and such material commands a premium price. The previously employed batch processes have been only partially successful in connection with the production of pulverized products and has not been at all successful in the production of granulated products.

A highly successful continuous process has been developed and is disclosed in U.S. Patents Nos. 2,729,554 and 2,741,545 to Nielsson. The continuous system disclosed in said Nielsson patents starts with a pulverized phosphate material which is supplied at a constant rate to an inclined rotary tube through which it progresses by a rolling or helical motion from the input end to the output end of the tube. During its passage through the tube, the material is successively treated with ammoniating materials and acid whereby the reaction may be carried progressively forward to produce a uniform high nitrogen material. If it is desired to produce a granulated product of high nitrogen content, moisture is added in carefully controlled amounts to bring about a granulation of the ammoniated product as it progresses through the rotary drum. After discharge the granulated product is dried and screened. Granules of acceptable size are processed for shipment whereas smaller particles or fines are returned to the inlet of the reaction tube for recycling.

At first impression, it might appear that the adoption of the batch process is a step backward from the Nielsson continuous process. However, the continuous process must be carried out with great accuracy requiring expensive metering equipment for the various dry and liquid components. When granulation is performed the product leaving the reaction tube is very damp and must be dried and screened. The equipment and accessory equipment thus required is very expensive and can only be installed in large plants servicing a very large geographical area and thus in an economic position to afford great capital investment.

In contrast with this, the present invention achieves comparable or superior results with a simple batch mixer having certain unique features and a sparger of novel design which makes it possible to add acid and ammoniating materials to a batch of pulverized or granulated phosphate material in the mixer. The product requires only the most rudimentary drying and requires no screening. The capital investment is only a small fraction of that required for installation of the Nielsson process.

Referring now to the drawings forming a part of this application:

Figure 1:
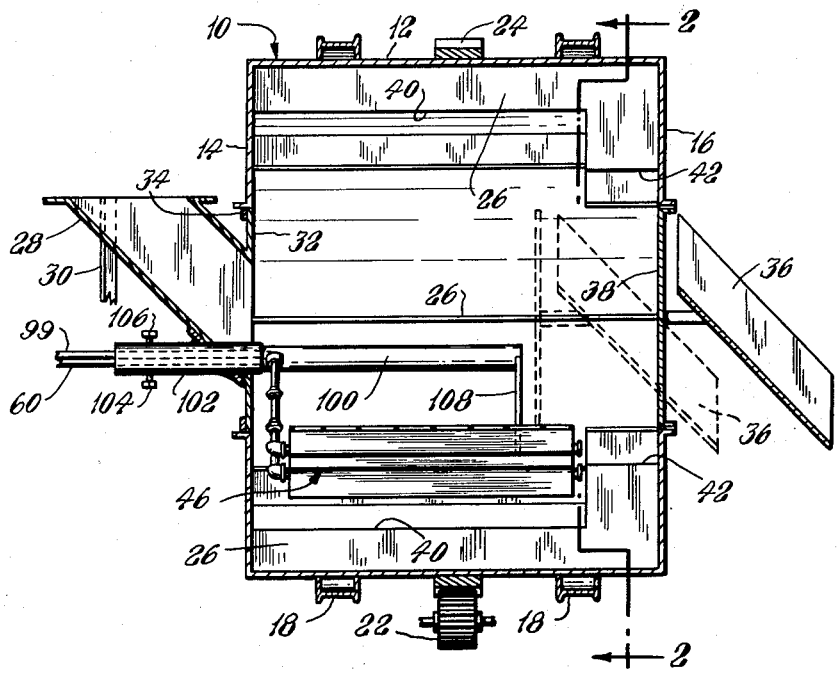
Fig. 1 is a vertical sectional view of apparatus embodying the present invention.
Figure 2:
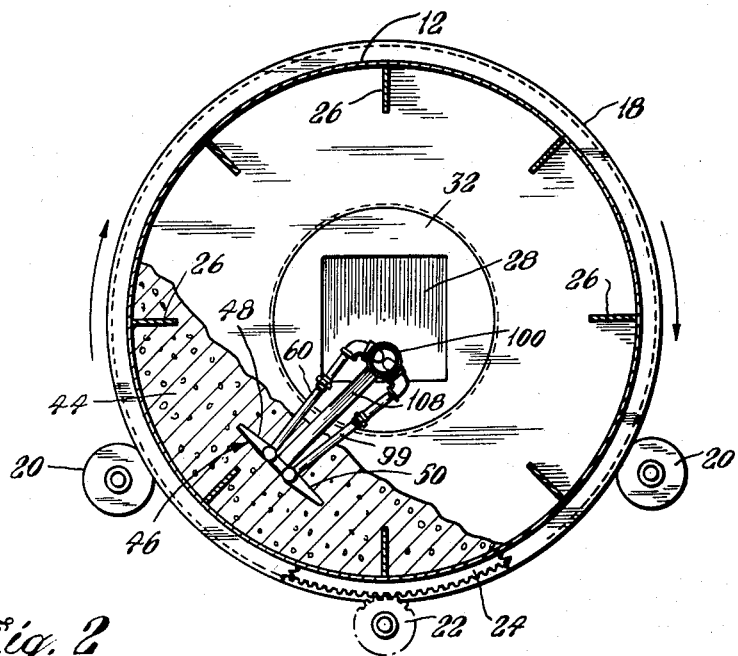
Fig. 2 is a sectional view taken along the line 2—2 in Fig. 1.

In Fig. 1 a mixing drum 10, consisting of a cylindrical outer wall 12 and ringlike end walls 14 and 16, is shown equipped with tires 18 which rest upon trunnions 20 (see Fig. 2). The drum 10 may be driven for rotation about a horizontal axis by a pinion 22 meshing with a ring gear 24 secured to the outer periphery of the drum 10. Located within the drum are flights 26 which will be described in greater detail hereinbelow. The flights 26 as shown in Fig. 2 are secured along their outer longitudinal edges to the inner surface of the cylindrical wall 12 and an appropriate number of such flights 26, is distributed at uniform intervals around the inner periphery of the drum 10. Except for the features to be described hereinbelow the flights 26 are conventional and may take specifically different forms in different commercially available mixing drums.

The drum 10 is provided with an inlet chute 28 which is secured to a rigid frame 30 of any suitable construction for the purpose of holding the chute 28 against rotation with the drum 10. As shown in Fig. 2, the chute 28 may be square in cross-section if so desired. In any event, the chute 28 terminates in an opening extending into the body of the drum and formed in a circular plate 32 rigid with the chute 28 and fitting rather closely into the opening afforded by the ringlike wall 14 of the drum 10. Any suitable dust packing means 34 may be used at this point.

At the opposite end of the drum 10 there may be provided an unloading chute 36 supported upon a portion, not shown, of the main frame 30 for movement lengthwise of the axis of rotation of the drum 10. The movable chute 36 is provided with a closure disc 38 of suitable diameter to close the opening afforded by the ringlike wall 16 of the drum 10 when the chute 36 is in the position shown in full lines in Fig. 1. In such position the chute 36 is in an inoperative position. The chute 36 may be moved inwardly to the dotted line position shown in Fig. 1 wherein it will be so located as to receive material carried by the flights 26, thus to unload the drum when processing has been completed.

For the purposes of the present invention the flights 26 are different from the flights which normally would be provided in a mixing drum considered suitable for the mixing of powdered or granular materials conventionally utilized in fertilizers. Thus as shown in Fig. 1, the major portion of the length of each flight 26 terminates along an edge 40 which is spaced from the center of rotation of the drum a substantially greater distance than the edge 42 of the remainder of the flight. Conventional mixer flights are provided with straight edges extending from end to end of the flight in approximately the same radial position as the edge 42 illustrated herein. This alteration of the flight design has been found to be essential to the success of the present invention.

Thus, when a charge of pulverized or granular material is placed in the drum 10, in a proper quantity with respect to the particular dimensions of the drum, and the drum is rotated in a clockwise direction (Fig. 2), the charge will form a relatively dense sloping body 44. The maximum depth of the body 44 will be approximately twice the radially inward extent of the portions of the flights which terminate along the edges 40. Therefore as the flights move through the charge they will carry the lower portion in a clockwise direction and will progressively release it to gravitate in the opposite direction. The body of the charge is thus subjected to a rolling motion, uniform throughout the major portion of the length of the drum. For the purposes of the present invention it is important that the charge be maintained in a dense, although thoroughly agitated, condition in contrast with the aerated low density clouds of material which would be formed if the flights 26 were to be of conventional radial dimensions.

With the dense, thoroughly agitated bed of material provided as just described, spargers may be positioned well beneath the surface of the bed to supply calculated amounts of ammoniating material and acid. If the spargers are carefully designed to give uniform distribution of such materials throughout the useful length of the mixing drum 10, it is possible to produce fertilizer products fully comparable with or superior to the products of the Nielsson continuous process as discussed above. A suitable form of sparger will now be described.

Figure 3:
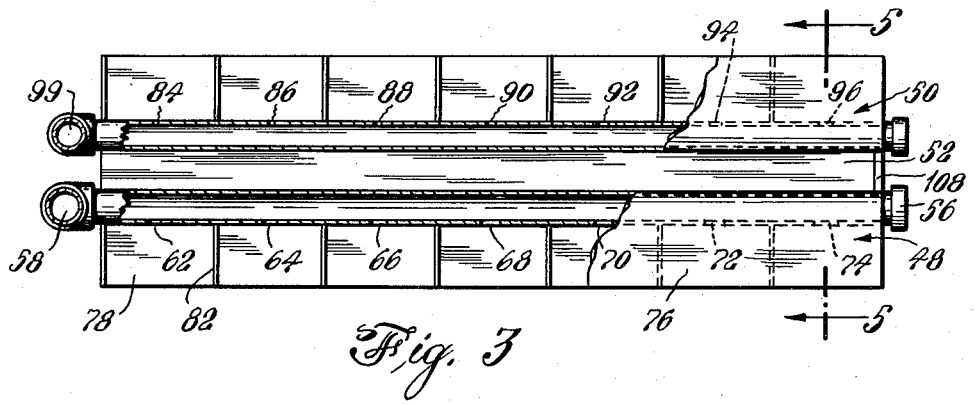
Fig. 3 is a plan view with parts broken away, of a sparger forming a part of the present invention.
Figure 4:
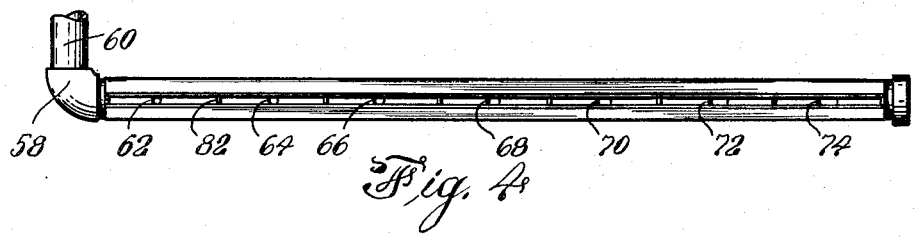
Fig. 4 is a side elevational view of the same.
Figure 5:
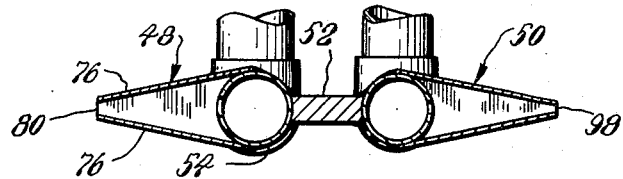
Fig. 5 is a sectional view taken along the line 5—5 in Fig. 3.

Referring to Figs. 3, 4 and 5, it will be seen that the sparger, referred to generally at 46, comprises two oppositely directed sparger heads 48 and 50 secured to a rigid bar 52. The head 48 is made up of a length of tube 54 welded to the bar 52 and closed at one end by a plug 56. At the other end the tube 54 is connected by an elbow 58 with an inlet pipe 60. The tube 54 is provided with a plurality of rather closely spaced perforations or orifices which are numbered 62 through 74. The perforation 62, being closest to the inlet pipe 60 is of a particular diameter, say $15/32''$, and each perforation to the right thereof is progressively larger in diameter. Thus the perforation 64 may be $16/32''$, the perforation 66 may be $17/32''$, and so on, the largest perforation 74 being $21/32''$ in diameter. The progressively larger perforations are calculated on the basis of the pressure of infeed and the characteristics of the liquid to result in the discharge of substantially identical quantities of liquid from each perforation throughout the length of the sparger. It will be recognized that the pressure will drop progressively along the length of the tube 54 and that the increased diameter of discharge perforations is calculated to compensate for such drop.

Two converging plates 76 and 78 are secured, as by welding to the tube 54 to form a narrow slot 80 for example $1/16''$ wide, from which the liquid will be discharged as a substantially solid and uniform sheet. The plates 76 and 78 are made rigid by suitable spacers 82.

The second sparger head 50 is identical in construction to the head 48, just described, except that it may be smaller in essential dimensions. Thus the perforations, or orifices, 84 through 96 in tube 97 may progressively increase in diameter from $12/64''$ to $19/64''$ in diameter. The slot 98 may be $1/32''$ wide. An infeed pipe is shown at 99.

The particular dimensions just given for an embodiment of the sparger heads 48 and 50 are for a particular installation in which ammoniating solution is discharged from the head 48 under a pressure of from 6 to 15 p.s.i. to give a flow of 350 pounds of solution in 90 seconds, the specific gravity of the solution being 1.045 at 60° F. Acid is discharged from the head 50 at the same pressure to give a flow of 250 pounds in 90 seconds, the specific gravity of the acid being 1.8279 at 60° F. It will be apparent that the other designs, within the principle of the present invention, will be required for different rates of flow and other conditions.

The sparger heads 48 and 50 may be mounted in a fixed but adjustable position within the drum 10 by any suitable means. The heads should be so disposed as to discharge the respective liquids in opposite directions into the body 44 of material being treated, in a position well below the surface whereby the reactions may be completed with a minimum loss of chemicals. For example, the heads may be located at an angle of about 25° to about 40° with the vertical whereby the heads will lie substantially in the center of the body 44 as illustrated in Fig. 2. The heads should be about as close as is practicable to the edges 40 of the flights 26 as the latter rotate with the drum 10. Also, the heads should be of such length as to extend as much of the total length of the body 44 as is practical. Thus, in Fig. 1, it will be observed that the heads 48 and 50 extend from a position very close to the infeed end of the drum 10 to a position in proximity with the unloading portions of the flights 26. In this manner the liquids discharged from the heads 48 and 50 will be very evenly distributed through the rolling body 44 for adequate and efficient treatment of the pulverized or granular material in the body.

In the particular apparatus chosen for illustration herein, the portions of the flights 26 which lie adjacent the sparger are about 6" high, the body 44 is a little over 12" high and the sparger slots 80 and 98 lie at least 4" below the surface of the body 44.

The infeed pipes 60 and 99 serve in part as supports for the sparger heads 48 and 50. Thus these pipes extend to an enclosing tube 100 through which they extend to the exterior of the drum 10 to be connected with suitable sources of liquids (not shown). The tube 100 extends through a sleeve 102 secured to the non-rotating infeed chute 28. Set screws 104, 106 are provided to hold the tube 100 and thus the sparger heads 48 and 50 in desired angular position within the drum 10. At its inner end the tube 100 has secured thereto a brace 108 which in turn is secured to the bar 52 of the sparger. The sparger heads, pipes and other associated parts, may be made of suitable corrosion resistant metal or they may be coated with or encased in suitable elastomers to reduce deterioration due to the action of chemicals and the abrasion to which these parts are subjected.

In the use of the present invention a charge, of suitable size, of material such as pulverized or granulated super phosphate or triple phosphate plus other desirable materials such as urea, potash and the like, is weighed and placed in the drum 10 and the drum is placed in rotation. A suitably calculated amount of ammoniating liquid and a suitably calculated amount of an acid such as sulfuric acid or phosphoric acid, are supplied respectively to the sparger heads 48 and 50. One of the liquids will be discharged by the head 50 in a direction opposite to the rotation of the drum 10. The other liquid will be discharged by the head 48 in the direction of rotation of the drum 10. Thus, the liquids will not be brought into immediate contact with each other but rather will be distributed upon and absorbed by particles which later will come into contact with each other for the completion of an efficient chemical reaction.

As shown in the drawings, the ammoniating liquid is discharged from the head 48 which extends in the direction of rotation of the drum 10. It may be preferred to reverse the positions of the heads 48 and 50 whereby to discharge the ammoniating liquid in a direction opposite to the rotation of the drum 10.

As indicated above, the present invention is useful in connection with the ammoniating of pulverized phosphate materials. It is a particular advantage, however, that it is also useful in the ammoniating of granulated phosphate materials. Materials of the latter type may be purchased in the market and may be sharply upgraded in value by the present invention. Granulation is ordinarily achieved by the addition of carefully controlled amounts of moisture to pulverized materials which are then manipulated to cause formation of pellets of desired size. The present invention, for the first time, affords the great advantage that such granulated material may be ammoniated at very high rates without danger of disintegration of the individual granules. While a certain amount of moisture is added in the present process, it will be understood that the chemical reactions are in part exothermic and the temperature of the body 44 increases considerably during the process. Thus the granules do not remain sufficiently moist to endanger their integrity. When the completed charge is unloaded through the chute 36 it does not need to be dried by the use of specialized dryer equipment. For example adequate drying is secured by the choice of conveying equipment which will aerate the mass permitting the remaining moisture to flash into steam. A bucket conveyor is ideally suited for this purpose.

In view of the fact that the present invention is useful in connection with pulverized or granulated phosphate materials as well as with particular types of such materials such as super phosphates, triple phosphates and the like, all such materials are intended to be included in the definition "particulate phosphate material" as used in the claims.

What is claimed is:

1. Apparatus for ammoniating particulate phosphate material comprising an axially rotatable cylindrical mixing drum, a plurality of radially inwardly projecting flights extending lengthwise of the inner periphery of said drum, means for rotating said drum, means for supplying to said drum a charge of particulate phosphate material in such predetermined quantity as to form in said rotating drum a dense body rolling about a horizontal axis and having a maximum depth at least about twice as great as the amount of radially inward projection of said flights, and said body being substantialy uniform in depth and density throughout the major portion of the length of said flights and of said drum, and a sparger having a head provided with orifice means for discharging in one direction an ammoniating liquid at a volumetric rate which at any given instant is substantially identical throughout the length of said sparger, said sparger having a second head provided with orifice means for discharging in an opposite direction an acid in liquid form at a volumetric rate which at any given instant is substantially identical throughout the length of said sparger, means for mounting said sparger in a fixed position within said drum with the discharging means thereof at least about four inches below the surface of said body of phosphate material and so directed as to discharge ammoniating liquid and acid in opposite directions generally parallel with the upper surface of said body, said sparger having a length substantially equal to and being disposed within that portion of said body which is substantially uniform in depth and density.

2. The apparatus set forth in claim 1 wherein each of said sparger heads includes an elongated tubular member closed at one end and connected at the other end with a source of appropriate liquid under pressure, each of said tubular members being provided with a series of discharge orifices running from end to end thereof and progressively increasing in cross sectional area toward the closed end in proportion to the progressive decrease in pressure upon the liquid within said tubular member.

References Cited in the file of this patent
UNITED STATES PATENTS 2,729,554     Nielsson     Jan. 3, 1956
2,741,545     Nielsson     Apr. 10, 1956